(12) United States Patent
Jung et al.

(10) Patent No.: US 8,124,683 B2
(45) Date of Patent: Feb. 28, 2012

(54) POLYCARBONATE RESIN COMPOSITION WITH HIGH WELD LINE STRENGTH

(75) Inventors: Hyuk Jin Jung, Uiwang-si (KR); Jong Cheol Lim, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 26 days.

(21) Appl. No.: 12/615,308

(22) Filed: Nov. 10, 2009

(65) Prior Publication Data

US 2010/0152358 A1 Jun. 17, 2010

(30) Foreign Application Priority Data

Dec. 17, 2008 (KR) .............................. 2008-0128593

(51) Int. Cl.
*C08F 290/04* (2006.01)
*C08L 51/00* (2006.01)
*C08L 53/00* (2006.01)

(52) U.S. Cl. .......... 524/504; 524/506; 524/511; 525/67; 523/206

(58) Field of Classification Search .................. 524/504, 524/506, 511; 523/206; 525/67
See application file for complete search history.

(56) References Cited

U.S. PATENT DOCUMENTS

| 3,988,389 A | 10/1976 | Margotte et al. |
| 5,128,409 A | 7/1992 | Gaggar |
| 5,292,786 A | 3/1994 | Gaggar et al. |
| 2007/0249768 A1* | 10/2007 | Hong et al. ................... 524/123 |

FOREIGN PATENT DOCUMENTS

WO　WO 2008/062924　　*　5/2008

* cited by examiner

*Primary Examiner* — James J Seidleck
*Assistant Examiner* — Deve E Valdez
(74) *Attorney, Agent, or Firm* — Summa, Additon & Ashe, P.A.

(57) ABSTRACT

A polycarbonate resin composition of the present invention comprises (A) about 30 to about 95 parts by weight of thermoplastic polycarbonate resin; (B) about 1 to about 50 parts by weight of rubber-modified-vinyl graft copolymer; (C) about 0 to about 50 parts by weight of vinyl copolymer; and (D) about 1 to about 50 parts by weight of amorphous thermoplastic polyester copolymer. The resin composition of the present invention can have excellent physical properties such as weld line strength, fluidity, impact resistance, and heat resistance.

9 Claims, No Drawings

POLYCARBONATE RESIN COMPOSITION WITH HIGH WELD LINE STRENGTH

CROSS REFERENCE TO RELATED APPLICATIONS

This application claims priority from Korean Patent Application No. 2008-0128593, filed Dec. 17, 2008 in the Korean Intellectual Property Office, the disclosure of which is incorporated herein by reference in its entirety.

FIELD OF THE INVENTION

The present invention relates to polycarbonate resin composition.

BACKGROUND OF THE INVENTION

Polycarbonate resins are used in a variety of engineering plastic applications because of their excellent impact resistance, self-extinguishing properties, dimensional stability and high heat resistance compared to other engineering plastics.

However, the use of polycarbonate resins is limited in many applications because polycarbonates can have high notch sensibility and thus can exhibit reduced impact strength along parts of molded products that are subjected to stress. Moreover, polycarbonate resins require high molding temperatures due to the low fluidity of polycarbonates, unlike other general thermoplastic resins. Therefore, physical properties of the polycarbonate resin can be reduced by thermal decomposition due to over-heating. Also high injection pressures and velocities may be used during injection molding to compensate for the low fluidity of the polycarbonate resin, which can add further stress to parts of the molded articles. This residual stress can significantly reduce impact resistance, which can further limit the uses or applications for such resins.

Many efforts have been made to solve these problems. For example, one method to reduce notch sensibility of polycarbonate adds an impact modifier or reinforcing particles. The impact modifier can have, for example, a core/shell structure in which vinyl monomers form a shell structure and polybutadiene or acrylate rubber form a core structure. Alternatively, the impact modifier can be an olefin copolymer.

The addition of an impact modifier can significantly prevent the reduction of the impact resistance of polycarbonate resin, although residual stress can remain. However, simply adding only an impact modifier does not improve the fluidity of polycarbonate resin. Further, the polycarbonate resin can exhibit discoloration and/or reduced physical properties due to changes in the impact modifier that can result from exposure to high temperatures during processing. Therefore, uses for polycarbonate resin including only an impact modifier without improving fluidity are limited.

One method for overcoming weak points in polycarbonate resins adds acrylonitrile-butadiene-styrene (ABS) graft copolymer prepared by emulsion graft polymerization as an impact modifier and styrene-acrylonitrile copolymer (SAN) to improve fluidity. The product can be manufactured at lower processing temperatures than polycarbonate resin, because the thermoplastic resin composition prepared by mixing ABS resin and SAN resin with polycarbonate resin exhibits improved fluidity as well as reduced notch sensibility. However, molded products can exhibit significantly reduced mechanical strength of weld parts during injection molding due to limited compatibility of polycarbonate resin and SAN resin when ABS resin and SAN resin are simply mixed with polycarbonate resin.

U.S. Pat. No. 3,988,389 discloses increasing the amount of butadiene rubber of a polycarbonate, ABA resin, or SAN resin composition to improve weld strength. However, fluidity and heat stability are reduced when the amount of butadiene rubber increases.

U.S. Pat. Nos. 5,128,409 and 5,292,786 disclose mixing polyalkylmethacrylate with a composition including ABS graft copolymer and polycarbonate. This does not, however, solve the problems of decreased fluidity of the resin composition and reduced color uniformity and staining.

SUMMARY OF THE INVENTION

The present invention provides a polycarbonate resin composition which can exhibit excellent fluidity.

The present invention also provides a polycarbonate resin composition which can exhibit excellent weld line strength and fluidity.

The present invention further provides a polycarbonate resin composition which can exhibit excellent impact resistance and heat resistance.

The polycarbonate resin composition of the invention includes polycarbonate resin, rubber modified-vinyl graft copolymer, optionally vinyl copolymer, and amorphous thermoplastic polyester copolymer. In exemplary embodiments of the invention, the polycarbonate resin composition includes:

(A) about 30 to about 95 parts by weight of thermoplastic polycarbonate resin, (B) about 1 to about 50 parts by weight of rubber-modified-vinyl graft copolymer, (C) about 0 to about 50 parts by weight of vinyl copolymer; and (D) about 1 to about 50 parts by weight of amorphous thermoplastic polyester copolymer, each based on the total amount of the polycarbonate resin composition.

The rubber-modified-vinyl graft copolymer (B) can be prepared by graft polymerizing (B-1) about 5 to about 95% by weight of monomer mixture which includes (B-1.1) about 40 to about 95% by weight of styrene, α-methyl styrene, halogen or C1-C4 alkyl substituted styrene, C1-C8 alkyl ester of methacrylic acid, C1-C8 alkyl ester of acrylic acid, or a combination thereof and (B-1.2) about 5 to about 60% by weight of acrylonitrile, methacrylonitrile, C1-C8 alkyl ester of methacrylic acid, C1-C8 alkyl ester of acrylic acid, maleic acid anhydride, C1-C4 alkyl or phenyl N-substituted maleimide or a combination thereof (wherein when both monomer mixtures B-1.1 and B-1.2 include a C1-C8 alkyl ester of methacrylic acid and/or a C1-C8 alkyl ester of acrylic acid, at least one of the monomer mixtures B-1.1 or B-1.2 also includes a different monomer in addition to the C1-C8 alkyl ester of methacrylic acid and/or a C1-C8 alkyl ester of acrylic acid), and (B-2) about 5 to about 95% by weight of a rubber comprising butadiene rubber, acryl rubber, ethylene-propylene rubber, styrene-butadiene rubber, acrylonitrile-butadiene rubber, isoprene rubber, ethylene-propylene-diene monomer rubber (EPDM), polyorganosiloxane-polyalkyl(meth) acrylate rubber complex or a combination thereof.

The vinyl copolymer (C) may be a vinyl copolymer or combination thereof prepared by copolymerizing (C-1) about 30 to about 95% by weight of styrene, α-methyl styrene, halogen or C1-C4 alkyl substituted styrene, C1-C8 alkyl ester of methacrylic acid, C1-C8 alkyl ester of acrylic acid or a combination thereof and (C-2) about 5 to about 70% by weight of acrylonitrile, methacrylonitrile, C1-C8 alkyl ester of methacrylic acid, C1-C8 alkyl ester of acrylic acid, maleic acid anhydride, C1-C4 alkyl or phenyl N-substituted maleimide or a combination thereof (wherein when both monomer mixtures C-1 and C-2 include a C1-C8 alkyl ester of methacrylic acid and/or a C1-C8 alkyl ester of acrylic acid, at least one of the monomer mixtures C-1 or C-2 also includes a different monomer in addition to the C1-C8 alkyl ester of methacrylic acid and/or a C1-C8 alkyl ester of acrylic acid).

In one embodiment of the present invention, the present invention provides a polycarbonate resin composition comprising;

(A) about 40 to about 95 parts by weight of thermoplastic polycarbonate resin, (B) about 2 to about 40 parts by weight of rubber modified-vinyl graft copolymer prepared by graft polymerizing (B-1) about 25 to about 95% by weight of monomer mixture which includes (B-1.1) 40 to about 90% by weight of styrene, α-methyl styrene, C1-C4 alkyl substituted styrene, or a combination thereof and (B-1.2) 10 to about 60% by weight of acrylonitrile, methacrylonitrile, maleic acid anhydride, C1-C4 alkyl or phenyl N-substituted maleimide or a combination thereof; and (B-2) about 5 to about 75% by weight of a rubber comprising butadiene rubber, acryl rubber, styrene-butadiene rubber, polyorganosiloxane-polyalkyl(meth)acrylate rubber complex or a combination thereof, (C) about 1 to about 30 parts by weight of a vinyl copolymer or a combination thereof prepared by copolymerizing (C-1) about 30 to about 85% by weight of styrene, α-methyl styrene, halogen or C1-C4 alkyl substituted styrene or a combination thereof and (C-2) about 15 to about 70% by weight of acrylonitrile, methacrylonitrile, maleic acid anhydride C1-C4 alkyl or phenyl N-substituted maleimide or a combination thereof, and (D) about 3 to about 40 parts by weight of amorphous thermoplastic polyester copolymer.

For example, the amorphous thermoplastic polyester copolymer (D) can be a polyester copolymer resin comprising polyethylene terephthalate resin in which about 5 to about 80% by weight of ethylene glycol is replaced with 1,4-cyclohexane dimethanol.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The present invention relates to polycarbonate resin compositions. The polycarbonate resin compositions of the invention include polycarbonate resin, rubber-modified-vinyl graft copolymer, optionally vinyl copolymer and amorphous polyester copolymer and can exhibit excellent weld line strength without reduction of fluidity and impact resistance.

The present inventors have found that adding amorphous polyester copolymer to a resin composition including polycarbonate resin, rubber-modified-vinyl graft copolymer, and optionally vinyl copolymer can overcome problems associated with conventional polycarbonate resin compositions. The resultant compositions can exhibit excellent weld line strength without reduction of fluidity and impact resistance.

The polycarbonate resin composition according to the present invention includes polycarbonate resin, rubber-modified vinyl graft copolymer, optionally vinyl copolymer and amorphous polyester copolymer. The polycarbonate resin composition according to the present invention can exhibit excellent weld line strength as well as a balance of properties such as impact resistance, heat resistance, fluidity, pigmentation and appearance.

Thermoplastic Polycarbonate Resin

The polycarbonate resin of component (A) of the resin composition of the present invention can be prepared by reacting one or more diphenols represented by the following Chemical Formula 1 with phosgene, halogen formate or a carbonic diester.

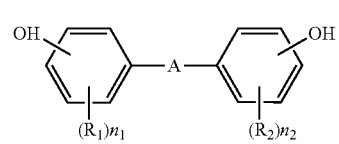

[Chemical Formula 1]

wherein in the above Chemical Formula 1:

A is a linker comprising a single bond, substituted or unsubstituted C1 to C30 linear or branched alkylene, substituted or unsubstituted C2 to C5 alkenylene, substituted or unsubstituted C2 to C5 alkylidene, substituted or unsubstituted C1 to C30 linear or branched haloalkylene, substituted or unsubstituted C5 to C6 cycloalkylene, substituted or unsubstituted C5 to C6 cycloalkenylene, substituted or unsubstituted C5 to C10 cycloalkylidene, substituted or unsubstituted C6 to C30 arylene, substituted or unsubstituted C1 to C20 linear or branched alkoxylene, halogen acid ester, carbonate ester, CO, S, or $SO_2$, each $R_1$ and $R_2$ is independently substituted or unsubstituted C1 to C30 alkyl or substituted or unsubstituted C6 to C30 aryl, and $n_1$ and $n_2$ are each independently integers ranging from 0 to 4, and wherein the term "substituted" refers to one substituted with at least one or more substituents comprising halogen, C1 to C30 alkyl, C1 to C30 haloalkyl, C6 to C30 aryl, C1 to C20 alkoxy, or a combination thereof.

Examples of the diphenols may include without limitation 4,4'-dihydroxydiphenyl, 2,2-bis-(4-hydroxyphenyl)-propane, 2,4-bis-(4-hydroxyphenyl)-2-methylbuthane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane. Moreover, hydroquinol and resorcinol can be used as the diphenol. Examples of hydroquinol and resorcinol may include without limitation 2,2-bis-(4-hydroxyphenyl)-propane, 2,2-bis-(3,5-dichloro-4-hydroxyphenyl)-propane, 1,1-bis-(4-hydroxyphenyl)-cyclohexane. 2,2-bis-(4-hydroxyphenyl)-propane (also referred to as "bisphenol A", which is an aromatic polycarbonate commonly used in industry), and the like, and combinations thereof.

The polycarbonate resin may have a weight average molecular weight (Mw) of about 10,000 to about 200,000, for example about 15,000 to about 80,000.

In accordance with various embodiments of the present invention, suitable polycarbonates incorporated into the composition of the present invention may be branched in a known manner. For example, such branched polycarbonates can be prepared by incorporating about 0.05 to about 2 mol %, based on the total quantity of diphenols used in polymerization, of tri- or higher functional compounds, for example, those with three or more phenolic groups.

The polycarbonate may be a homopolycarbonate, a copolycarbonate, or a combination thereof.

Furthermore, the polycarbonate may be replaced partly or entirely with an aromatic polyester-carbonate resin which is acquired by polymerizing in the presence of an ester precursor, for example, difunctional carboxylic acid.

The polycarbonate resin composition of the invention may include the polycarbonate resin (A) in an amount of about 30 to about 95 parts by weight, for example about 40 to about 95 parts by weight, based on the total weight of the polycarbonate resin composition.

(B) Rubber Modified-Vinyl Graft Copolymer

The rubber modified-vinyl graft copolymer (B) can be prepared by graft polymerizing (B-1) about 5 to about 95% by weight, for example about 25 to about 95% by weight, of monomer mixture which includes (B-1.1) about 40 to about 95% by weight, for example about 40 to about 90% by weight, of styrene, α-methyl styrene, halogen or C1-C4 alkyl substituted styrene, C1-C8 alkyl ester of methacrylic acid, C1-C8 alkyl ester of acrylic acid, or a combination thereof and (B-1.2) about 5 to about 60% by weight, for example about 10 to about 60% by weight, of acrylonitrile, methacrylonitrile, C1-C8 alkyl ester of methacrylic acid, C1-C8 alkyl ester of acrylic acid, maleic acid anhydride, C1-C4 alkyl or phenyl N-substituted maleimide or a combination thereof, and (B-2) about 5 to about 95% by weight, for example about 5 to about 75% by weight, of at least one rubber comprising butadiene rubber, acryl rubber, ethylene-propylene rubber, styrene-butadiene rubber, acrylonitrile-butadiene rubber, isoprene rubber, ethylene-propylene-diene monomer rubber (EPDM), polyorganosiloxane-polyalkyl(meth)acrylate rubber complex or a combination thereof.

The C1-C8 alkyl esters of methacrylic acid or C1-C8 alkyl esters of acrylic acid are methacrylic acid esters or acrylic acid esters including C1 to C8 alkyl groups prepared by the reaction of methacrylic acid or acrylic acid with C1-C8 alcohol, for example, methacrylic acid methyl ester, methacrylic acid ethyl ester, acrylic acid ethyl ester, methacrylic acid propyl ester, and the like, and combinations thereof.

In an exemplary embodiment of the present invention, the rubber-modified-vinyl graft copolymer (B) may be prepared by graft copolymerizing rubber comprising butadiene rubber, acryl rubber, styrene-butadiene rubber, or a combination thereof, acrylonitrile, and optionally (meth)acrylic alkyl ester monomer.

In another embodiment of the present invention, the rubber-modified-vinyl graft copolymer (B) may be prepared by graft copolymerizing rubber comprising butadiene rubber, acryl rubber, styrene-butadiene rubber, or a combination thereof, and (meth)acrylic alkyl ester monomer.

In another embodiment of the present invention, the rubber-modified-vinyl graft copolymer (B) may be an acrylonitrile-butadiene-styrene (ABS) graft copolymer or methacrylate-butadiene-styrene (MBS) copolymer.

The particle diameter of the rubber polymer (B-2) may be about 0.05 to about 4 μm, for example about 0.2 to about 0.4 μm, to improve impact strength and surface property of molded products.

The graft copolymer can be prepared by known methods such as emulsion polymerization, suspension polymerization, solution polymerization, or bulk polymerization. For example, the graft copolymer can be prepared by emulsion polymerization or bulk polymerization by reacting the aromatic vinyl monomer in the presence of rubber polymer and using a polymerization initiator.

The polycarbonate resin composition can include the rubber modified-vinyl graft copolymer (B) in an amount of about 1 to about 50 parts by weight, for example about 2 to about 40 parts by weight, based on the total weight of the polycarbonate resin composition.

(C) Vinyl Copolymer

The vinyl copolymer (C) can be a vinyl copolymer or a combination thereof prepared by copolymerizing (C-1) about 30 to about 95% by weight, for example about 30 to about 85% by weight, of styrene, α-methyl styrene, halogen or C1-C4 alkyl substituted styrene, C1-C8 alkyl ester of methacrylic acid, C1-C8 alkyl ester of acrylic acid or a combination thereof and (C-2) about 5 to about 70% by weight, for example about 15 to about 70% by weight, of acrylonitrile, methacrylonitrile, C1-C8 alkyl ester of methacrylic acid, C1-C8 alkyl ester of acrylic acid, maleic acid anhydride, C1-C4 alkyl or phenyl N-substituted maleimide or a combination thereof.

The C1-C8 alkyl esters of methacrylic acid or C1-C8 alkyl esters of acrylic acid are methacrylic acid esters or acrylic acid esters including C1 to C8 alkyl groups prepared by the reaction of methacrylic acid or acrylic acid with C1-C8 alcohol, for example, methacrylic acid methyl ester, methacrylic acid ethyl ester, acrylic acid ethyl ester, methacrylic acid propyl ester, and the like, and combinations thereof.

A vinyl copolymer can be produced as a by-product during the preparation of the graft copolymer (B) and can be produced when less rubber polymer is grafted onto an excess amount of the monomer mixture or an excess amount of chain transfer agent which is used as a molecular weight control agent is used. The amount of the vinyl copolymer (C) used to prepare the resin composition in the present invention does not include the vinyl copolymer of the by-product of graft copolymer (B).

In an exemplary embodiment, the vinyl copolymer (C) may be prepared by copolymerizing a mixture of styrene, acrylonitrile and optionally methacrylic acid methyl ester monomer; a mixture of α-methyl styrene, acrylonitrile and optionally methacrylic acid methyl ester monomer; or a mixture of styrene, α-methyl styrene, acrylonitrile and optionally methacrylic acid methyl ester monomer. The vinyl copolymer (C) which includes styrene-acrylonitrile may be prepared by emulsion polymerization, suspension polymerization, solution polymerization, or bulk polymerization and may have a weight average molecular weight of about 15,000 to about 300,000.

In another embodiment, the vinyl copolymer (C) may be prepared by copolymerizing a mixture of methacrylic acid methyl ester monomer and optionally acrylic acid methyl ester monomer. The vinyl copolymer (C) which includes methacrylic acid methyl ester polymer may be prepared by emulsion polymerization, suspension polymerization, solution polymerization, or bulk polymerization and may have a weight average molecular weight of about 20,000 to about 250,000.

In another embodiment, the vinyl copolymer (C) may be a copolymer of styrene and maleic acid anhydride and can be prepared by continuous bulk polymerization or solution polymerization. The ratio of the two monomer components can be varied over a wide range. For example, the content of the maleic acid anhydride may be about 5 to about 50% by weight. The molecular weight of styrene-maleic acid anhydride may be also vary over a wide range. For example, the weight average molecular weight can be about 20,000 to about 200,000 and the inherent viscosity can be about 0.3 to about 1.9.

The styrene monomer used to prepare vinyl copolymer (C) may be replaced with another substituted vinyl monomer such as p-methyl styrene, vinyl toluene, 2,4-dimethyl styrene, α-methyl styrene, and the like, and combinations thereof.

The vinyl copolymer (C) used in the preparation of the resin composition of the present invention described above can be used as alone or as a combination thereof.

The polycarbonate resin composition of the invention can include the vinyl copolymer (C) in an amount of less than about 50 parts by weight, for example about 1 to about 30 parts by weight, based on the total weight of the polycarbonate resin composition.

(D) Amorphous Thermoplastic Polyester Copolymer

The amorphous thermoplastic polyester copolymer (D) can be prepared by polycondensation of an aromatic dicarboxylic acid or ester thereof, and a $C_2$-$C_{12}$ diol in which at least a part of the $C_2$-$C_{12}$ diol is replaced with cycloaliphatic diol, such as cyclohexane dimethanol. The preparation thereof can be readily carried out by a person of ordinary skill in the art.

Examples of the aromatic dicarboxylic acid or ester thereof can include without limitation terephthalic acid (TPA), isophthalic acid (IPA), 1,2-naphthalene dicarboxylic acid, 1,4-naphthalene dicarboxylic acid, 1,5-naphthalene dicarboxylic acid, 1,6 naphthalene dicarboxylic acid, 1,7-naphthalene dicarboxylic acid, 1,8-naphthalene dicarboxylic acid, 2,3-naphthalene dicarboxylic acid, 2,6 naphthalene dicarboxylic acid, 2,7-naphthalene dicarboxylic acid, dimethyl terephthalate (DMT) which is aromatic dicarboxylate in which acid is replaced with dicarboxylic acid, dimethyl isophthalate, alkyl ester of naphthalene dicarboxylic acid or dimethyl-1,2-naphthalate, dimethyl-1,5-naphthalate, dimethyl-1,7-naphthalate, dimethyl-1,8-naphthalate, dimethyl-2,3-naphthalate, dimethyl-2,6-naphthalate, dimethyl-2,7-naphthalate, and the like, and combinations thereof.

Examples of the diols having 2 to 12 carbon atoms may include without limitation ethylene glycol, 1,2-propylene glycol, 1,3-propylene glycol, 2,2-dimethyl-1,3-propandiol, 1,3-butandiol, 1,4-butandiol, 1,5-pentandiol, 1,6-hexandiol, 1,3-cyclohexandiol, 1,4-cyclohexane dimethanol as diol esters which have about 2 to about 12 carbons, and the like, and combinations thereof.

An exemplary amorphous thermoplastic polyester copolymer of the present invention is polyethylene terephthalate copolymer including 1,4-cyclohexane dimethanol (CHDM) represented by the following Chemical Formula 2. This polymer can be prepared when part of the ethylene glycol of polyethylene terephthalate resin is replaced with 1,4-cyclohexane dimethanol.

[Chemical Formula 2]

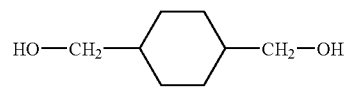

The polyester copolymer can be, for example, polyethylene terephthalate in which about 5 to about 80% by weight, for example about 20 to about 40% by weight, of ethylene glycol is replaced with 1,4-cyclohexane dimethanol. If the amount of 1,4-cyclohexane dimethanol is less than about 5 mol %, dimensional stability of the thermoplastic resin composition can be reduced. If the amount of 1,4-cyclohexane dimethanol is more than about 80 mol %, heat-resistance of the thermoplastic resin composition can be reduced.

The inherent viscosity of the amorphous thermoplastic polyester copolymer (D) may be about 0.6 to about 1.0 dL/g.

The polycarbonate resin composition of the invention can include the amorphous thermoplastic polyester copolymer in an amount of about 1 to about 50 parts by weight, for example about 3 to about 40 parts by weight, based on the total weight of the polycarbonate resin composition. If the amorphous thermoplastic polyester copolymer is used in an amount less than about 3 parts of weight, the improvement of the weld line strength of the resin composition can be reduced. If the amorphous thermoplastic polyester copolymer is used in an amount more than 40 parts of weight, the heat-resistance can be reduced.

The polycarbonate resin composition according to the present invention may further include one or more additives selected without limitation from flame retardants, heat stabilizers, antioxidants, light-stabilizers, fluorescent brightening agents, lubricants, mold lubricants, nucleating agents, antistatic agents, reinforcers, inorganic additives, pigments, dyes and the like, and combinations thereof. The additive(s) can be used in an amount of about 0.1 to about 60 parts by weight, for example about 1 to about 40 parts by weight, based on about 100 parts by weight of component (A), component (B) and component (C).

The resin composition of the present invention can be prepared by known methods of preparing a resin composition. For example, the components of the compositions can be mixed, optionally with one or more additives, and the mixture can be melt extruded using an extruder and prepared in pellet form.

The polycarbonate resin composition according to the present invention can be suitable for use in outer parts of cellular phones, computers, door linings and the like which require impact resistance and have many weld parts, since it can improve fluidity and weld strength of molded articles.

According to another aspect of the present invention, there is provided molded products prepared using the polycarbonate resin composition of the present invention, including without limitation outer parts of cellular phones, computers, door linings and the like.

The invention may be better understood by reference to the following examples which are intended for the purpose of illustration and are not to be construed as in any way limiting the scope of the present invention, which is defined in the claims appended hereto.

EXAMPLES

Components (A), (B), (C) and (D) used in the following examples and comparative examples are prepared as follows.

(A) Polycarbonate Resin

Bisphenol-A based polycarbonate with a weight average molecular weight of 25,000 (Mw) made by Teijin Chemicals Ltd. of Japan (product name: Panlite L'1250 AP) is used as the polycarbonate resin in the examples and comparative examples.

(B) Rubber-modified-vinyl graft copolymer

Butadiene rubber latex having an average particle diameter of 0.28 μm in an amount to provide 58 parts by weight based on the total quantity of monomer, 29 parts by weight of styrene, 13 parts by weight of acrylonitrile, and 150 parts by weight of deionized water are mixed. To the mixture, 1.0 part by weight of potassium oleate, 0.4 parts by weight of cumenhydroperoxide, and 0.3 parts by weight of mercaptan-containing chain transfer agent are added. The blend is kept at 75° C. for 5 hours to obtain g-ABS latex. To the g-ABS latex, 0.1% of sulfuric acid is added and coagulated and then dried to obtain a rubber modified polystyrene resin (g-ABS) in a powder form.

(C) Vinyl Copolymer 72 parts by weight of styrene, 28 parts by weight of acrylonitrile, and 120 parts by weight of deionized water are mixed. To the mixture, 0.3 parts by weight of azobisisobutylonitrile (AIBN), 0.5 parts by weight of tricalciumphosphate and 0.2 parts by weight of mercaptan-containing chain transfer agent are added and then suspension polymerized to prepare SAN copolymer resin. The resultant is washed, dehydrated and dried to obtain SAN copolymer resin in a powder form.

(D) Amorphous Thermoplastic Polyester Copolymer

Polyethylene terephthalate-cyclohexene terephthalate copolymer consisting of 36 mol % of 1,4-cyclohexane dimethanol with inherent viscosity measured at 25° C. in α-chloro phenol solvent made by SK Chemical Ltd. of Korea (product name: S2008) is used as the amorphous thermoplastic polyester copolymer in the examples and comparative examples.

Examples 1-3 and Comparative Examples 1-4

The components and antioxidants and heat stabilizers in amounts shown in the following Table 1 are added to a conventional mixer, and the mixture is extruded through a conventional extruder (L/D=35, Φ=45 mm) to prepare pellets. Samples for evaluating mechanical properties, izod impact strength (which samples have weld part in the middle) and tensile strength are prepared by using a 10-oz injector under conditions of an injection temperature of 240 to 270° C. After the samples are prepared, the samples are maintained at a temperature of 23° C. and a relative humidity of 50% for 48 hours, and thereafter the physical properties of the samples are measured according to ASTM standards. The results are shown in the following Table 2.

Izod impact strengths samples which have a weld part in the middle are prepared. Izod impact strengths (kgf·cm/cm) of samples with a thickness of ⅛" without notch are measured according to ASTM D256.

Notch izod impact strengths and weld impact strengths of samples with a thickness of ⅛" are measured according to ASTM D256.

Vicat softening temperatures are measured according to ASTM D1525.

Tensile strengths and weld tensile strengths are measured according to ASTM D638.

Melt flow indexes are measured according to ASTM D1238 as a measure of the fluidity of each composition and are measured under the conditions of temperature of 250° C. and loading of 10 kgf.

TABLE 1

|  | Examples | | | Comparative examples | | | |
|---|---|---|---|---|---|---|---|
|  | 1 | 2 | 3 | 1 | 2 | 3 | 4 |
| (A) Polycarbonate resin | 55 | 55 | 70 | 55 | 55 | 70 | 20 |
| (B) Rubber modified-vinyl graft copolymer | 10 | 10 | 10 | 10 | 20 | 10 | 10 |
| (C) Vinyl copolymer resin | — | 10 | — | 35 | 25 | 20 | — |
| (D) Amorphous thermoplastic polyester copolymer | 35 | 25 | 20 | — | — | — | 70 |

TABLE 2

|  | Examples | | | Comparative examples | | | |
|---|---|---|---|---|---|---|---|
|  | 1 | 2 | 3 | 1 | 2 | 3 | 4 |
| Notch izod impact strength (⅛", kgcm/cm) | 70 | 69 | 75 | 66 | 75 | 75 | 10 |
| Tensile strength (kgf/cm2) | 570 | 590 | 540 | 570 | 490 | 580 | 480 |
| Weld impact strength (⅛", kgcm) | 110 | 100 | 138 | 9 | 11 | 10 | 100 |
| Weld tensile strength (kgf/cm2) | 474 | 467 | 490 | 360 | 370 | 380 | 430 |
| Melt flow index (g/10 min, 250° C./10 kgf) | 28 | 34 | 22 | 30 | 19 | 23 | 38 |
| Vicat softening temperature (° C.) | 122 | 122 | 129 | 121 | 112 | 130 | 88 |

Comparative Example 1 is the same as Example 1 except that component (D) is replaced with component (C). It can be seen that the weld impact strength and weld tensile strength of Comparative Example 1 are significantly reduced compared to Example 1. Comparative Example 2 is the same as Comparative Example 1 except that amount of component (B) is twice as much as that in Comparative Example 1. It can be seen that the weld impact strength is not significantly improved and melt flow index and Vicat softening temperature are significantly reduced. Comparative Example 3 is the same as Example 3 except that component (D) is replaced with component (C). It can be seen that weld impact strength and weld tensile strength of Comparative Example 1 are significantly reduced as compared to Example 3. Comparative Example 4 is the same as the Examples except that the amount of component (A) and (D) is outside of the range of the present invention. It can be seen that notch izod impact strength and Vicat softening temperature are significantly reduced.

As illustrated by the results set forth in Table 2, when proper amounts of polycarbonate resin, rubber modified-vinyl graft copolymer, vinyl copolymer resin, and amorphous thermoplastic polyester copolymer are added, the composition can have excellent weld strength, impact resistance, fluidity and heat resistance.

Thus the present invention can provide a resin composition exhibiting excellent physical properties of weld line strength and fluidity, impact resistance and heat resistance and the like.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A polycarbonate resin composition comprising:
   (A) about 30 to about 95 parts by weight of thermoplastic polycarbonate resin;
   (B) about 1 to about 50 parts by weight of rubber-modified-vinyl graft copolymer;
   (C) about 0 to about 50 parts by weight of vinyl copolymer; and
   (D) about 1 to about 50 parts by weight of amorphous thermoplastic polyester copolymer, wherein said amorphous thermoplastic polyester copolymer (D) is a polyethylene terephthalate resin in which about 5 to about 80% by weight of ethylene glycol is replaced with 1,4-cyclohexane dimethanol;
   wherein the amounts of (A), (B), (C) and (D) are based on the total weight of the polycarbonate resin composition.

2. The polycarbonate resin composition of claim 1, wherein said rubber-modified-vinyl graft copolymer (B) is prepared by graft polymerizing:
   (B-1) about 5 to about 95% by weight of a monomer mixture which includes:
      (B-1.1) about 40 to about 95% by weight of a monomer comprising styrene, α-methyl styrene, halogen or C1-C4 alkyl substituted styrene, C1-C8 alkyl ester of methacrylic acid, C1-C8 alkyl ester of acrylic acid, or a combination thereof; and
      (B-1.2) about 5 to about 60% by weight of a monomer comprising acrylonitrile, methacrylonitrile, C1-C8 alkyl ester of methacrylic acid, C1-C8 alkyl ester of acrylic acid, maleic acid anhydride, C1-C4 alkyl or phenyl N-substituted maleimide, or a combination thereof; and
   (B-2) about 5 to about 95% by weight of a rubber comprising butadiene rubber, acryl rubber, ethylene-propylene rubber, styrene-butadiene rubber, acrylonitrile-butadiene rubber, isoprene rubber, ethylene-propylene-diene monomer rubber(EPDM), polyorganosiloxane-polyalkyl(meth)acrylate rubber complex, or a combination thereof.

3. The polycarbonate resin composition of claim 1, wherein said vinyl copolymer (C) is a vinyl copolymer or a combination thereof prepared by copolymerizing:
   (C-1) about 30 to about 85% by weight of a monomer comprising styrene, α-methyl styrene, halogen or C1-C4 alkyl substituted styrene, or a combination thereof; and
   (C-2) about 15 to about 70% by weight of a monomer comprising acrylonitrile, methacrylonitrile, maleic acid anhydride C1-C4 alkyl or phenyl N-substituted maleimide, or a combination thereof.

4. The polycarbonate resin composition of claim 1, wherein said polycarbonate resin comprises:
   (A) about 40 to about 95 parts by weight of the thermoplastic polycarbonate resin;
   (B) about 2 to about 40 parts by weight of the rubber modified-vinyl graft copolymer;
   (C) about 1 to about 30 parts by weight of the vinyl copolymer; and
   (D) about 3 to about 40 parts by weight of the amorphous thermoplastic polyester copolymer,
   wherein the rubber modified-vinyl graft copolymer (B) is prepared by graft polymerizing:
   (B-1) about 25 to about 95% by weight of a monomer mixture which includes:
      (B-1.1) 40 to about 90% by weight of a monomer comprising styrene, α-methyl styrene, C1-C4 alkyl substituted styrene, or a combination thereof; and
      (B-1.2) 10 to about 60% by weight of a monomer comprising acrylonitrile, methacrylonitrile, maleic acid anhydride, C1-C4 alkyl or phenyl N-substituted maleimide, or a combination thereof; and
   (B-2) about 5 to about 75% by weight of a rubber comprising butadiene rubber, acryl rubber, styrene-butadiene rubber, polyorganosiloxane-polyalkyl(meth)acrylate rubber complex, or a combination thereof; and
   wherein the vinyl copolymer (C) is prepared by copolymerizing:
   (C-1) about 30 to about 85% by weight of a monomer comprising styrene, α-methyl styrene, halogen or C1-C4 alkyl substituted styrene or a combination thereof; and
   (C-2) about 15 to about 70% by weight of a monomer comprising acrylonitrile, methacrylonitrile, maleic acid anhydride C1-C4 alkyl or phenyl N-substituted maleimide, or a combination thereof.

5. The polycarbonate resin composition of claim 1, wherein said rubber modified-vinyl graft copolymer (B) is prepared by graft copolymerizing a rubber comprising butadiene rubber, acryl rubber, styrene-butadiene rubber, or a combination thereof, and a monomer comprising styrene, acrylonitrile, (meth)acrylic alkyl ester monomer, or a combination thereof.

6. The polycarbonate resin composition of claim 1, wherein said vinyl copolymer (C) is prepared by copolymerizing a monomer mixture of styrene and acrylonitrile; a monomer mixture of styrene, acrylonitrile and methacrylic acid methyl ester; a monomer mixture of α-methyl styrene and acrylonitrile; a monomer mixture of α-methyl styrene, acrylonitrile and methacrylic acid methyl ester; a monomer mixture of styrene, αmethyl styrene, and acrylonitrile; a monomer mixture of styrene, α-methyl styrene, acrylonitrile, and methacrylic acid methyl ester; a monomer mixture of methacrylic acid methyl ester and acrylic ester; or a monomer mixture of styrene and maleic acid anhydride.

7. The polycarbonate resin composition of claim 1, further comprising about 0.1 to about 60 parts by weight based on the about 100 parts by weight of the polycarbonate resin of an additive selected from flame retardants, heat stabilizers, antioxidants, light-stabilizers, fluorescent brightening agents, lubricants, mold lubricants, nucleating agents, antistatic agents, reinforcers, inorganic additives, pigments, dyes, or a combination thereof.

8. A molded article prepared from the polycarbonate resin composition of claim 1.

9. The polycarbonate resin composition of claim 1, wherein said amorphous thermoplastic polyester copolymer (D) is a polyethylene terephthalate resin in which about 20 to about 40% by weight of ethylene glycol is replaced with 1,4-cyclohexane dimethanol.

* * * * *